Jan. 25, 1955  S. D. LAPHAM  2,700,521
PALLET SEPARATOR
Filed Nov. 10, 1947  2 Sheets-Sheet 2
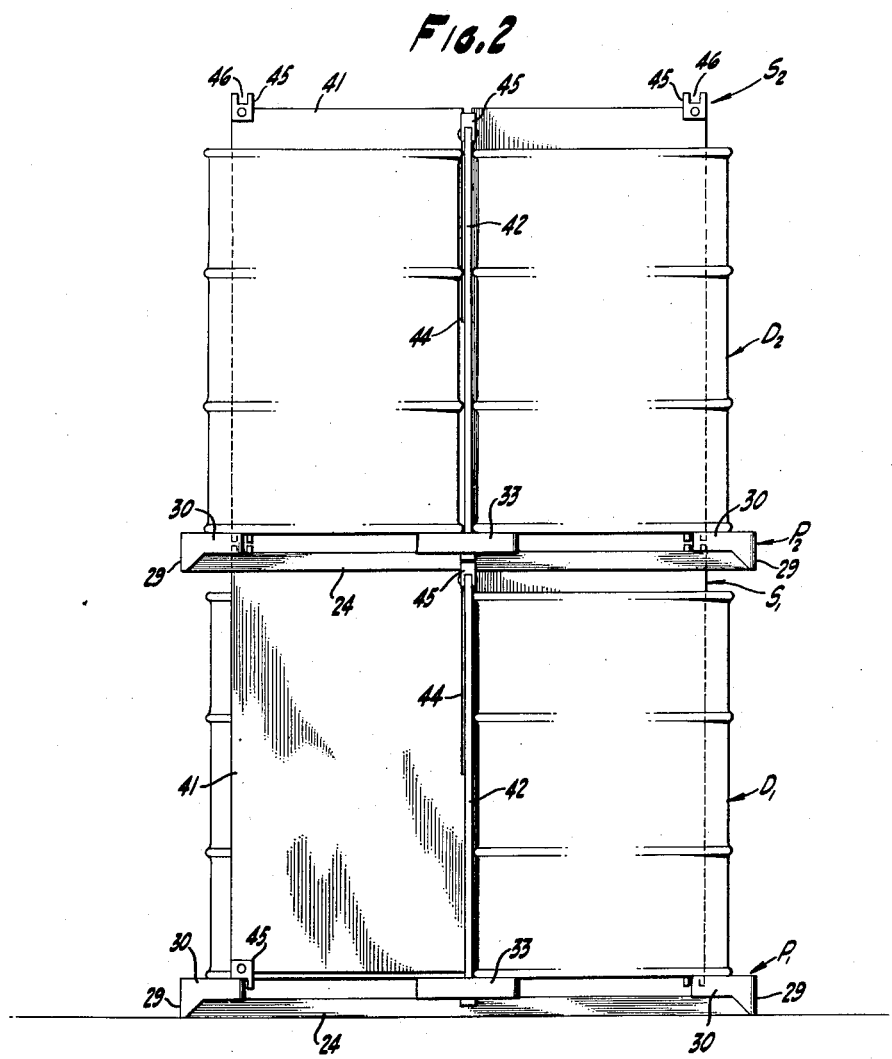
INVENTOR.
SIDNEY D. LAPHAM
BY
Mellin + Hanscom
ATTORNEYS

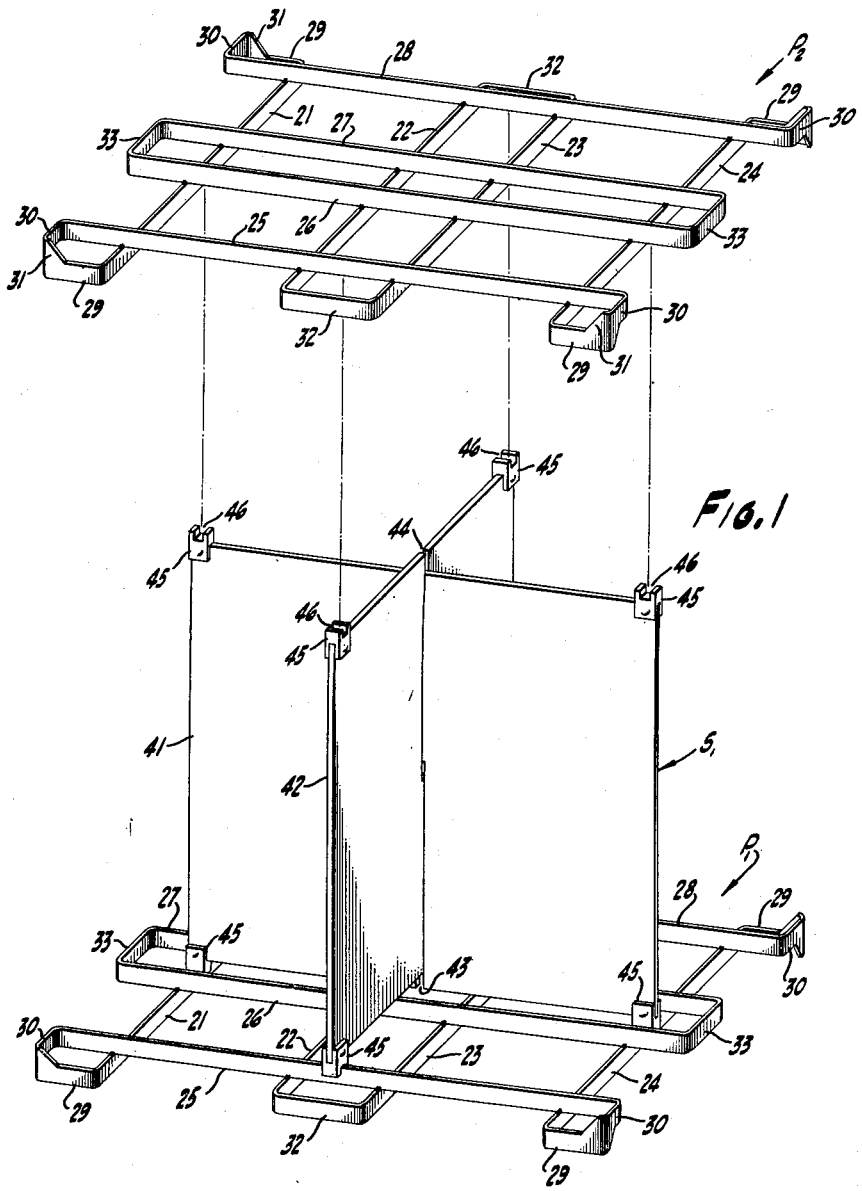

United States Patent Office 2,700,521
Patented Jan. 25, 1955

2,700,521
PALLET SEPARATOR

Sidney D. Lapham, Martinez, Calif.

Application November 10, 1947, Serial No. 785,041

3 Claims. (Cl. 248—120)

This invention relates to, and in general has for its object the provision of an article handling device, including a pair of superposed pallets held in spaced relation with respect to each other by a cruciform pallet separator.

A further object of this invention is the provision of a knock down cruciform pallet separator, including a pair of oppositely notched plates provided with means for interlocking them with the marginal portions of a pair of pallets so as to prevent the lateral displacement thereof with respect to the separator.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claims may be embodied in other forms.

Referring to the drawings:

Fig. 1 is an exploded perspective view of the combination of a pair of superposed pallets and an intervening pallet separator embodying the objects of my invention.

Fig. 2 is a front elevation of a pair of superposed pallets and pallet separators shown in their operative position with a tier of up ended drums supported on the edge of each pallet.

Each of the pallets illustrated in these figures includes a lower set of parallel co-planar and laterally spaced beams 21, 22, 23 and 24, and an upper identical set of beams 25, 26, 27 and 28 supported at right angles thereon and welded thereto to form a rigid integral structure. The distance between the outer beams 21 and 24 of the lower set of beams and between the outer beams 25 and 28 of the upper set of beams is less than the length of each of these beams. Provided on each end of each of the outer, lower beams 21 and 24 at right angles thereto is a lower return bend 29. Similarly provided at each end of the outer upper beams 25 and 28 is a lower return bend 30 welded to the immediately adjacent lower return bend 29 by means of gussets 31 provided thereon so as to form a looped corner.

If pallets of this type are to be used for handling drums, it is preferable to so space the beams 21 and 22, 23 and 24, 25 and 26, and 27 and 28, that the distance between them is equal to the chord of a 90° sector of the drum for which the pallet is designed. By resorting to this relation of spacing and drum diameter, the drum is given the greatest possible support without sacrificing clearance between the beams for the entry of the forks of an industrial truck. In this connection it is to be noted that in a pallet of this type, either the pallet or its load can be picked up by a truck depending upon whether the forks are between the beams or between the beams of the upper set of beams.

Seated on the lower pallet $P_1$, is a knock down cruciform pallet spacer $S_1$, including a pair of crossed upstanding plywood plates 41 and 42, the plate 41 being provided with a central upwardly extending notch 43 for the accommodation of the lower portion of the plate 42, and the plate 42 being provided with a central downwardly extending notch 44 for the accommodation of the upper portion of the plate 41. Fastened to each corner of each of these plates are fittings 45, each formed with a channel 46 arranged to straddle one of the beams on its associated pallet.

Supported on the upper set of beams of the pallet P, is a lower tier of upstanding drums $D_1$, the height of which are somewhat less than the effective height of the pallet separator. In this connection it is to be noted that the plates 41 and 42 of each separator are vertically offset, for the plate 41 rests on the lower set of beams of its supporting pallet, whereas the plate 42 rests on the upper set of beams. To permit this vertically offset relation of the crossed separator plates, the central notches thereof must extend to a point somewhat beyond the horizontal center of the plates.

Supported on the upper fittings 45 of the separator plates is an upper pallet $P_2$, and carried by this pallet is an upper tier of four upstanding drums $D_2$. Disposed between these drums and resting on the upper pallet is an upper separator $S_2$ arranged to receive a third pallet.

A multiple tier of drums of the character above described can be picked up by an industrial lift truck by inserting the forks thereof beneath the upper set of beams of the bottom pallet, and between the lower beams thereof. The top tier of drums can be removed from their supporting pallet collectively or individually, by inserting the forks of a truck immediately above the lower set of beams of this pallet, or the pallet and its entire load can be removed by inserting the forks below the upper set of beams of the pallet. Also, since there is positive clearance between any drum and the pallet immediately above it, it is possible to remove any selected drum of any tier of drums without removing or disturbing any other drum.

From the above description it will be appreciated that I have provided a pallet separator of simple construction, including a pair of interchangeable notched plates which can be used effectively in conjunction with two or more pallets for stacking upended drums in multiple tiers from which any selected drum can be removed without in any way disturbing any other drum.

I claim:

1. An article handling device comprising: a single pair of vertically spaced and aligned pallets each formed by a lower set of upstanding parallel rails fastened at right angles to an upper and similar set of upstanding parallel rails, said pallets being held in spaced relation by a pair of symmetrically crossed upstanding, vertically offset rectangular plates, said plates and pallets forming four identical open-sided, laterally accessible corner compartments for the segregated storage of articles.

2. A pallet separating and supporting member comprising: a first upstanding rectangular plate formed intermediate its lateral edges with a notch extending upwardly from its lower edge; a second upstanding rectangular plate formed intermediate its lateral edges with a vertical notch extending downwardly from its upper edge, said plates being crossed with the unnotched upper portion of said first plate receivable in the notch of the second plate, the unnotched lower portion of said second plate receivable in the notch of said first plate and the sum of the lengths of said two notches being substantially greater than the vertical length of said plates thereby to permit said plates to be vertically displaced relative to one another.

3. A pallet separating and supporting member comprising: a single pair of identical upstanding, symmetrically crossed and interlocked rectangular plates, the lower corners of said plates being provided respectively with upwardly and downwardly extending projections whereby said plates can be keyed to a supporting pallet.

References Cited in the file of this patent

UNITED STATES PATENTS

| | | |
|---|---|---|
| 753,343 | Wilson | Mar. 1, 1904 |
| 943,162 | Schlesinger | Dec. 14, 1909 |
| 963,250 | Rose | July 5, 1910 |
| 1,014,060 | Hawkes | Jan. 9, 1912 |
| 1,030,121 | Panther | June 18, 1912 |
| 1,079,789 | Merker | Nov. 25, 1913 |
| 1,480,897 | De Motte | Jan. 15, 1924 |
| 1,490,665 | Gifford | Apr. 15, 1924 |
| 1,738,276 | Barney | Dec. 3, 1929 |
| 1,913,655 | Benoit | June 13, 1933 |

FOREIGN PATENTS

| | | |
|---|---|---|
| 192,566 | Great Britain | Feb. 8, 1923 |